(12) United States Patent
Zhang et al.

(10) Patent No.: US 12,192,519 B2
(45) Date of Patent: Jan. 7, 2025

(54) NON-BINARY OCCUPANCY MAP FOR VIDEO BASED POINT CLOUD CODING

(71) Applicant: TENCENT AMERICA LLC, Palo Alto, CA (US)

(72) Inventors: Xiang Zhang, Sunnyvale, CA (US); Weiwei Feng, Mountain View, CA (US); Wen Gao, West Windsor, NJ (US); Shan Liu, San Jose, CA (US); Bing Jian, Cupertino, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/496,270

(22) Filed: Oct. 7, 2021

(65) Prior Publication Data

US 2022/0394294 A1 Dec. 8, 2022

Related U.S. Application Data

(60) Provisional application No. 63/197,274, filed on Jun. 4, 2021.

(51) Int. Cl.
*H04N 19/597* (2014.01)
*G06T 9/00* (2006.01)
*H04N 19/105* (2014.01)
*H04N 19/176* (2014.01)
*H04N 19/182* (2014.01)

(52) U.S. Cl.
CPC ........... *H04N 19/597* (2014.11); *G06T 9/001* (2013.01); *H04N 19/105* (2014.11); *H04N 19/176* (2014.11); *H04N 19/182* (2014.11)

(58) Field of Classification Search
CPC .. H04N 19/597; H04N 19/105; H04N 19/176; H04N 19/182; G06T 9/001
See application file for complete search history.

(56) References Cited

U.S. PATENT DOCUMENTS

2019/0311500 A1* 10/2019 Mammou ............... G06T 9/001
2020/0221125 A1* 7/2020 Budagavi ............. H04N 19/132

FOREIGN PATENT DOCUMENTS

CN        111726615 A   *   9/2020           H04N 19/136
EP        3 751 857 A1      12/2020
WO     2019/158821 A1      8/2019

OTHER PUBLICATIONS

International Search Report dated Jan. 24, 2022, issued by the International Searching Authority in application No. PCT/US2021/054555.
(Continued)

*Primary Examiner* — Hesham K Abouzahra
(74) *Attorney, Agent, or Firm* — Sughrue Mion, PLLC (57) ABSTRACT

Methods and apparatuses of encoding a video stream encoded using video point cloud coding include obtaining a source point cloud; generating an occupancy map including one or more pixels based on the source point cloud, an occupancy value associated with each pixel being a non-binary value; encoding the occupancy map to generate an encoded occupancy map, wherein a block of the encoded occupancy map corresponds to the one or more pixels of the occupancy map; selecting an occupancy value of the block based on the one or more pixels; and generating an encoded video stream based on the selected occupancy value.

8 Claims, 11 Drawing Sheets

(56) References Cited

OTHER PUBLICATIONS

Written Opinion dated Jan. 24, 2022, issued by the International Searching Authority in application No. PCT/US2021/054555.
"Information technology—Coded Representation of Immersive Media—Part 5: Visual Volumetric Video-based Coding (V3C) and Video-based Point Cloud Compression (V-PCC)", ISO/IEC JTC 1/SC 29/WG 11, FDIS_23090-5, 2020 (351 pages total).
Tulvan et al., "Use Cases for Point Cloud Compression (PCC)", International Organisation for Standardisation, Coding of Moving Pictures and Audio, ISO/IEC JTC1/SC29/WG11 MPEG2015/ N16331, Jun. 2016, Geneva, CH (8 pages total).
Mekuria et al., "Requirements for Point Cloud Compression", International Organisation for Standardisation, Coding of Moving Pictures and Audio, ISO/IEC JTC1/SC29/WG11 MPEG2016/ n16330, Feb. 2016, Geneva, CH (3 pages total).
ISO/IEC JTC 1/SC 29/WG 7, "V-PCC Codec Description", ISO/IEC JTC 1/SC 29/WG 7, MPEG 3D Graphics Coding, Convenorship: AFNOR (France), Dec. 1, 2020 (73 pages total).
Extended European Search Report dated Jun. 5, 2023, issued in European Application No. 21938131.6.

\* cited by examiner

NON-BINARY OCCUPANCY MAP FOR VIDEO BASED POINT CLOUD CODING

CROSS-REFERENCE TO RELATED APPLICATION

This application claims priority from U.S. Provisional Application No. 63/197,274, filed on Jun. 4, 2021, the disclosure of which is incorporated herein by reference in its entirety.

FIELD

This disclosure is directed to a set of advanced video coding technologies, more specifically, video based point cloud compression including non-binary occupancy map representation.

BACKGROUND

Advanced three-dimensional (3D) representations of the world are enabling more immersive forms of interaction and communication. They also allow machines to understand, interpret, and navigate our world. Point clouds have been widely used as a 3D representation of the world. For example, they may be used in autonomous driving vehicles for object detection and localization; in geographic information systems (GIS) for mapping, and in cultural heritage to visualize and archive cultural heritage objects and collections, etc. Several use cases associated with point cloud data have been identified, and some corresponding requirements for point cloud representation and compression have been developed.

Point clouds contain a set of high dimensional points, for example three dimensional (3D), each including 3D position information and additional attributes such as color, reflectance, etc. They can be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic cloud.

SUMMARY

In embodiments, a method of encoding a video stream encoded using video point cloud coding, is performed by at least one processor and includes: obtaining a source point cloud; generating an occupancy map including one or more pixels based on the source point cloud, an occupancy value associated with each pixel being a non-binary value; encoding the occupancy map to generate an encoded occupancy map, wherein a block of the encoded occupancy map corresponds to the one or more pixels of the occupancy map; selecting an occupancy value of the block based on the one or more pixels; and generating an encoded video stream based on the selected occupancy value.

In embodiments, an apparatus for encoding a video stream using video point cloud coding includes at least one memory configured to store program code; and at least one processor configured to read the program code and operate as instructed by the program code, the program code including first obtaining code configured to cause the at least one processor to obtain a source point cloud; first generating code configured to cause the at least one processor to generate an occupancy map including one or more pixels based on the source point cloud, an occupancy value associated with each pixel being a non-binary value, encoding code configured to cause the at least one processor to encode the occupancy map to generate an encoded occupancy map, wherein a block of the encoded occupancy map corresponds to the one or more pixels of the occupancy map; selecting code configured to cause the at least one processor to select an occupancy value of the block based on the one or more pixels; and second generating code configured to cause the at least one processor to generate an encoded video stream based on the selected occupancy value.

In embodiments, a non-transitory computer-readable medium storing computer instructions encoding a video stream using video point cloud coding that, when executed by at least one processor, cause the at least one processor to: obtain a source point cloud; generate an occupancy map including one or more pixels based on the source point cloud, an occupancy value associated with each pixel being a non-binary value, encode the occupancy map to generate an encoded occupancy map, wherein a block of the encoded occupancy map corresponds to the one or more pixels of the occupancy map; select an occupancy value of the block based on the one or more pixels; and generate an encoded video stream based on the selected occupancy value.

BRIEF DESCRIPTION OF TILE DRAWINGS

Further features, the nature, and various advantages of the disclosed subject matter will be more apparent from the following detailed description and the accompanying drawings in which.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

Embodiments of the present disclosure relate to an annealing iterative geometry smoothing to avoid over-smoothing in an iterative smoothing framework. Embodiments of the present disclosure relate to using a combination of average and median statistics to derive the reference points aiming to reduce the computational complexity of using the pure median.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
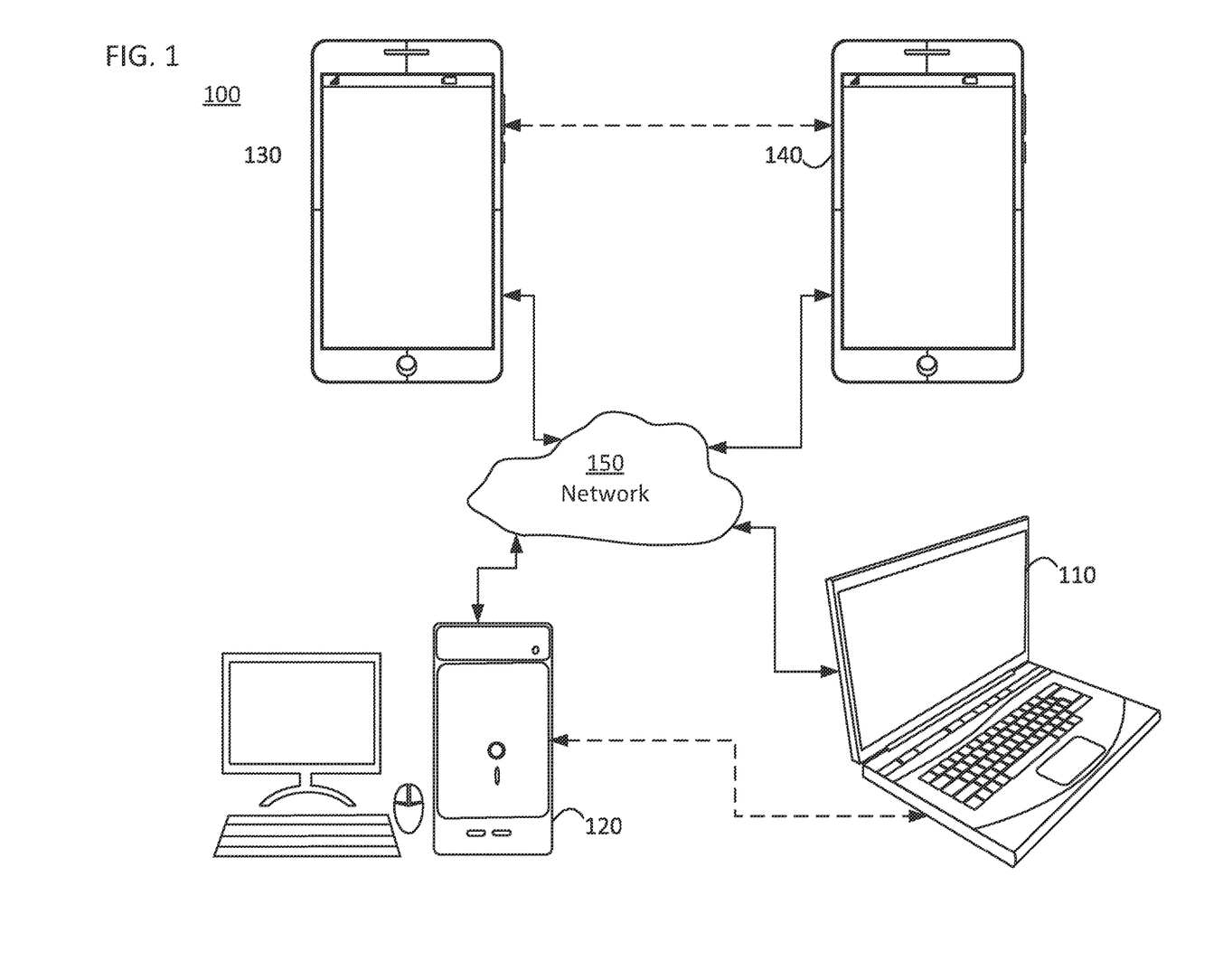
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
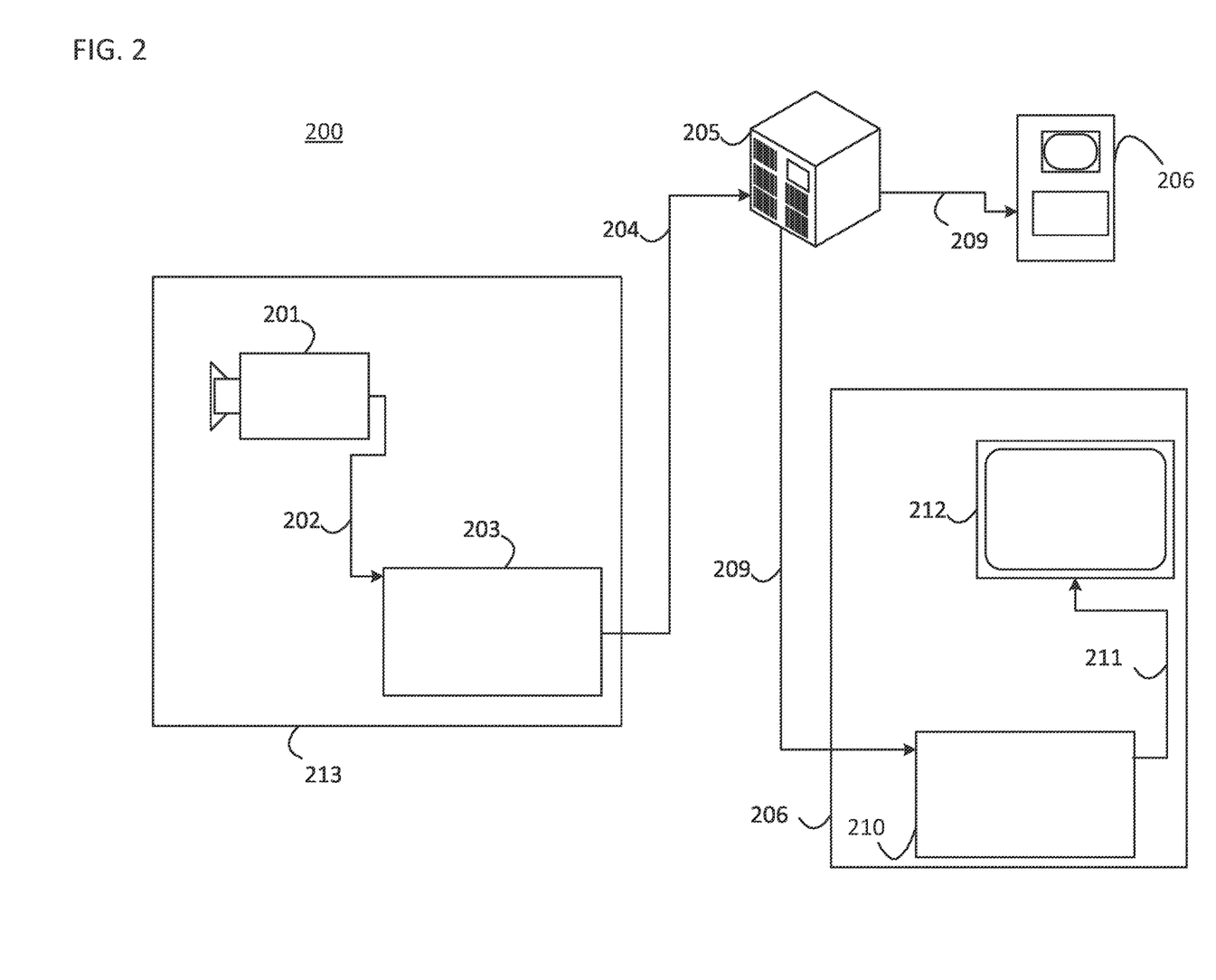
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
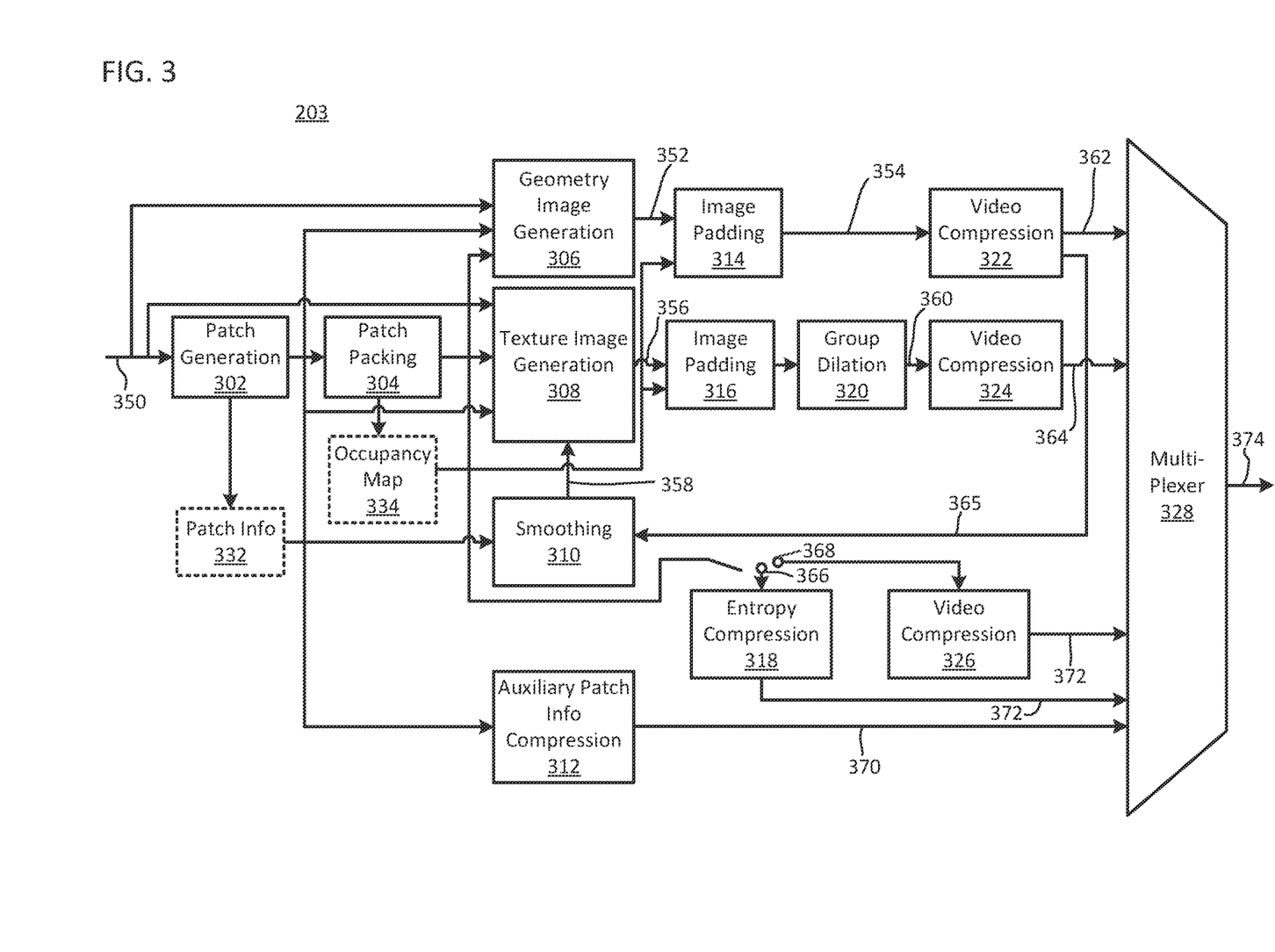
FIG. 3 is a schematic illustration of a simplified block diagram of a video encoder in accordance with an embodiment.
Figure 4:
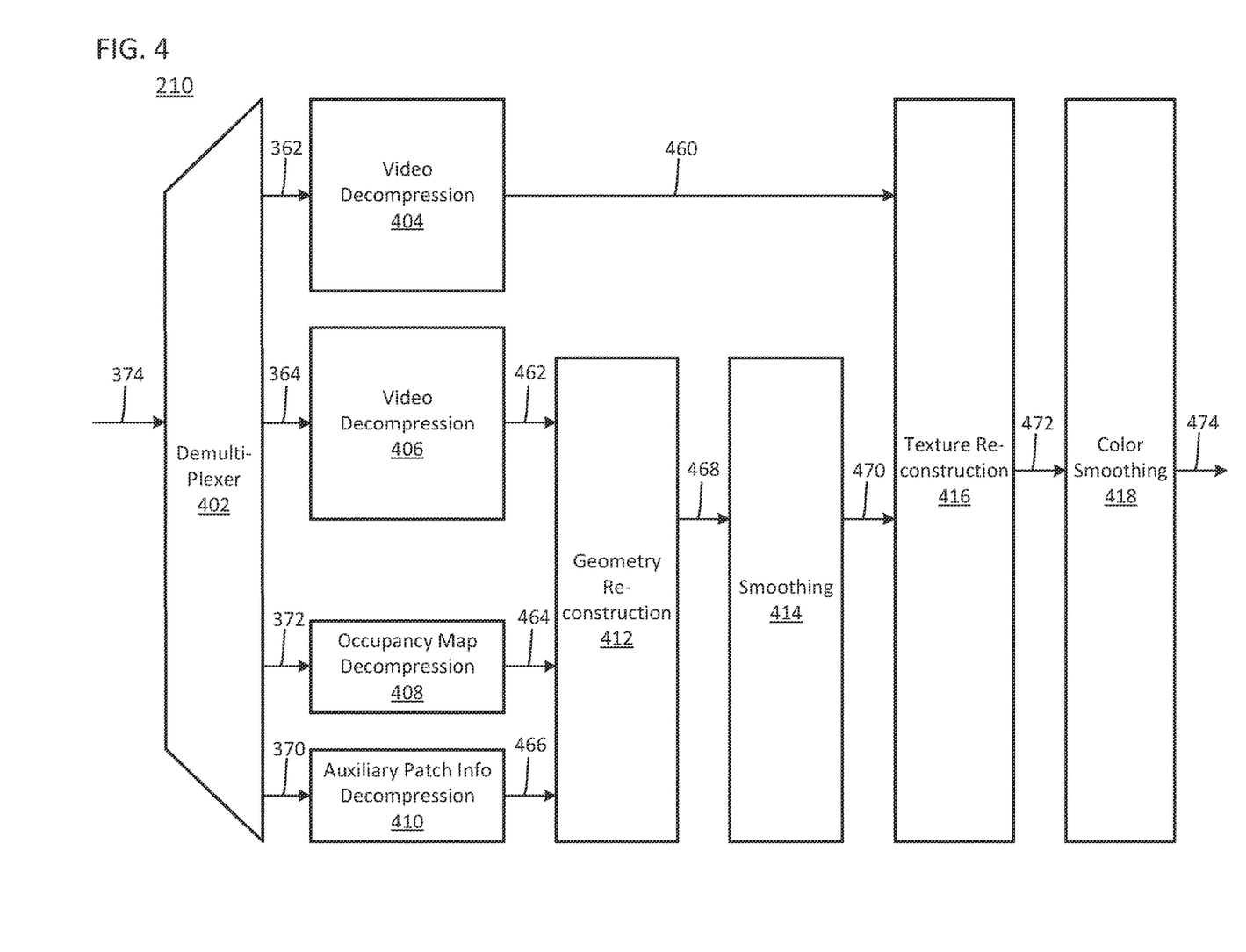
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Occupancy map in Video-based Point Cloud Compression (V-PCC)

In the MPEG PCC test model category 2 (TMC2) model, which may correspond to V-PCC, the occupancy map may be a binary image, where each binary pixel in the image indicates whether there is at least a 3D point projected onto it or not.

The occupancy map could be encoded with a precision of B×B blocks. B is a user-defined parameter. In order to achieve lossless encoding, B0 should be set to 1. In practice, B=2 or B=4 result in visually acceptable results, while significantly reducing the number of bits required to encode the occupancy map.

When an occupancy map block is occupied, even if only partially occupied, all points in the block will be reconstructed during the decoding process—with occupancy precision equal to 4, the number of reconstructed points per block is 16. In the most extreme case, a single occupied position is enough to mark the corresponding occupancy map block occupied. As a result, during the decoding process, 16 points will be generated instead of just 1 (assuming occupancy precision equal to 4).

Figure 5:
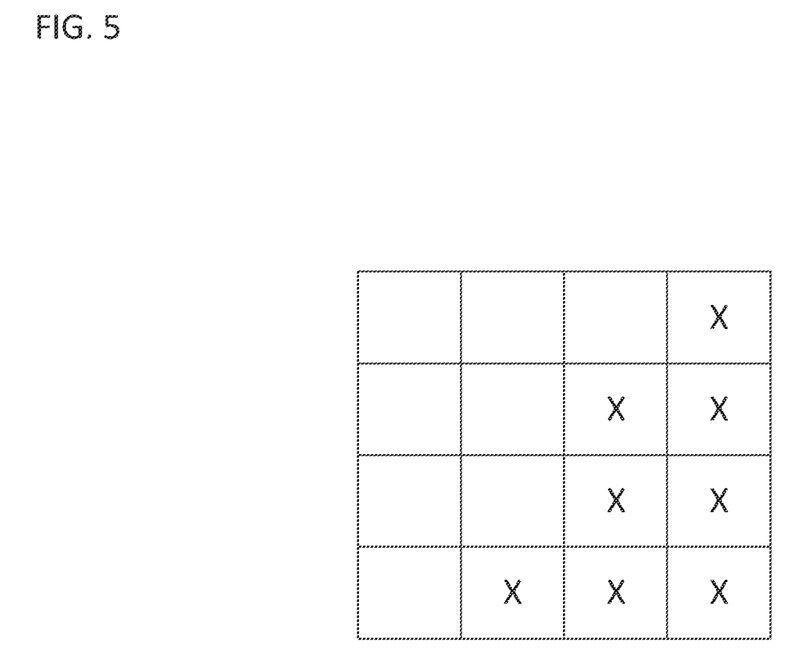
FIG. 5 illustrates an example of a B×B partially occupied block, in accordance with an embodiment.

In V-PCC, the occupancy map is constrained to be binary. This may cause geometry distortions when the occupancy precision B is larger than 1. For example in FIG. 5, where B=4, the block is partially occupied by pixels marked as "X". However, all the 16 pixels in the reconstructed occupancy map will be occupied.

Embodiments disclosed herein may be used separately or combined in any order. Further, each of the embodiments, for example encoders and decoders, may be implemented by processing circuitry (e.g., one or more processors or one or more integrated circuits). In one example, the one or more processors execute a program that is stored in a non-transitory computer-readable medium.

In embodiments, the occupancy map can be non-binary, i.e., its pixel values can be greater than 1. For example, if the occupancy map is represented by 8-bit, its value can be 0,1,2, . . . , 255.

Every value in the non-binary occupancy map can represent a certain pattern of the occupancy status of the corresponding B×B block. The bit depth of the occupancy map may be signaled in high-level syntax of the bitstream. The mapping strategy of the non-binary occupancy value to the occupancy status may be signaled in high-level syntax of the bitstream as well.

Figure 6:
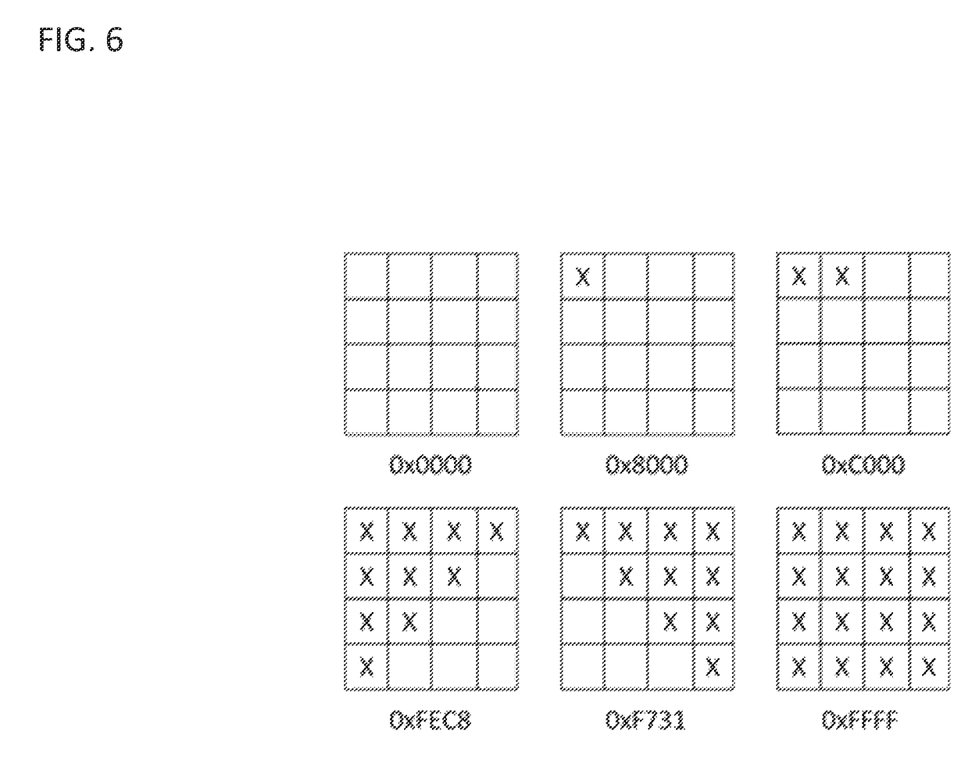
FIG. 6 illustrates examples of 16-bit occupancy representation of a 4×4 block, in accordance with an embodiment.

In one embodiment, B=4, and 16 bits may be used to represent all combination of occupancy patterns of 4×4 blocks. As an example, one can use the most significant bit (MSB) of the 16 bits to represent the occupancy status of the top-left pixel in the block; and use the least significant bit (LSB) of the 16 bits to represent the occupancy status of the bottom-right pixel in the block; and use the bits in-between the MSB and LSB to represent the occupancy status of the rest of the pixels in raster scan order. As shown in FIG. 6, some examples of 16-bit occupancy representation and the corresponding pattern are visualized. However, in embodiments, any mapping strategy can be used.

Figure 7:
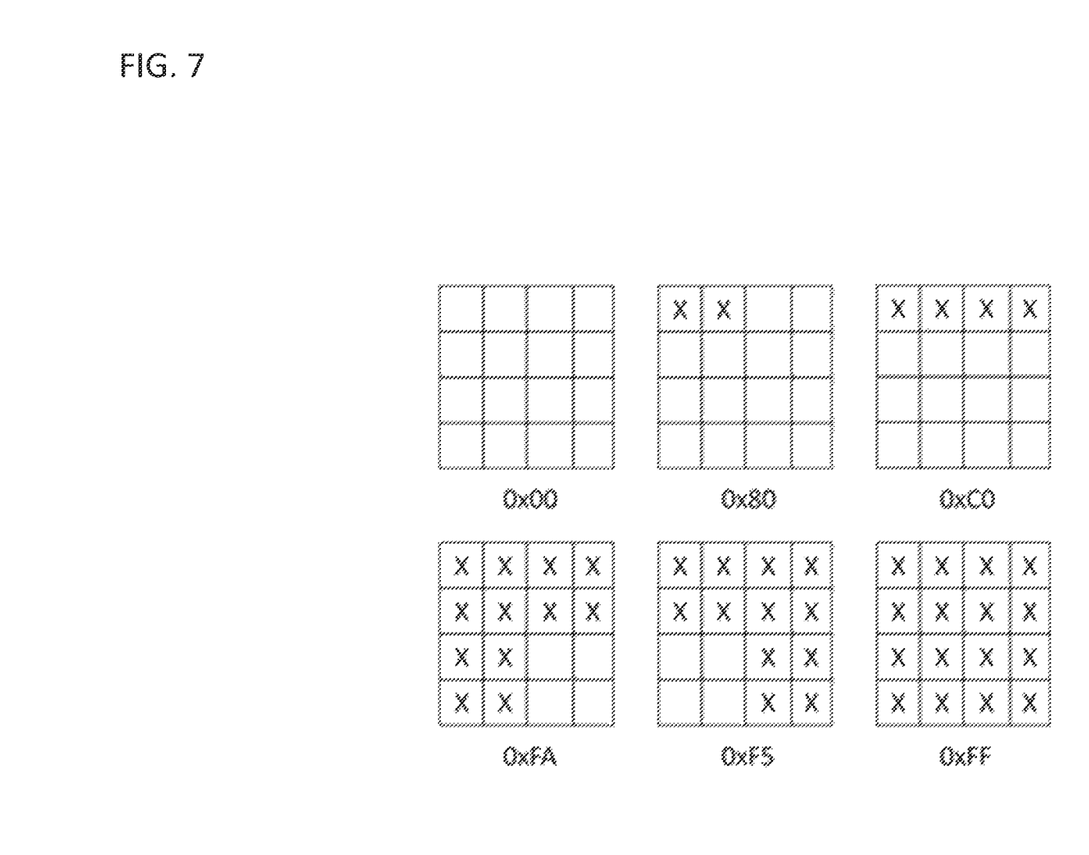
FIG. 7 illustrates examples of 8-bit occupancy representation of a 4×4 block, in accordance with an embodiment.

In another embodiment, B=4, and only 8 bits are allowed to represent the occupancy patterns of 4×4 blocks. Therefore, it is a representation of a subset of all occupancy patterns. For example, one can use each bit to represent every two pixels' occupancy status. For example, if a bit equals to 1, this may indicate that the two pixels corresponding to the bit are both occupied; otherwise, the two pixels are both empty. Examples are shown in FIG. 7. However, in embodiments, any mapping strategy can be used.

Figure 8:
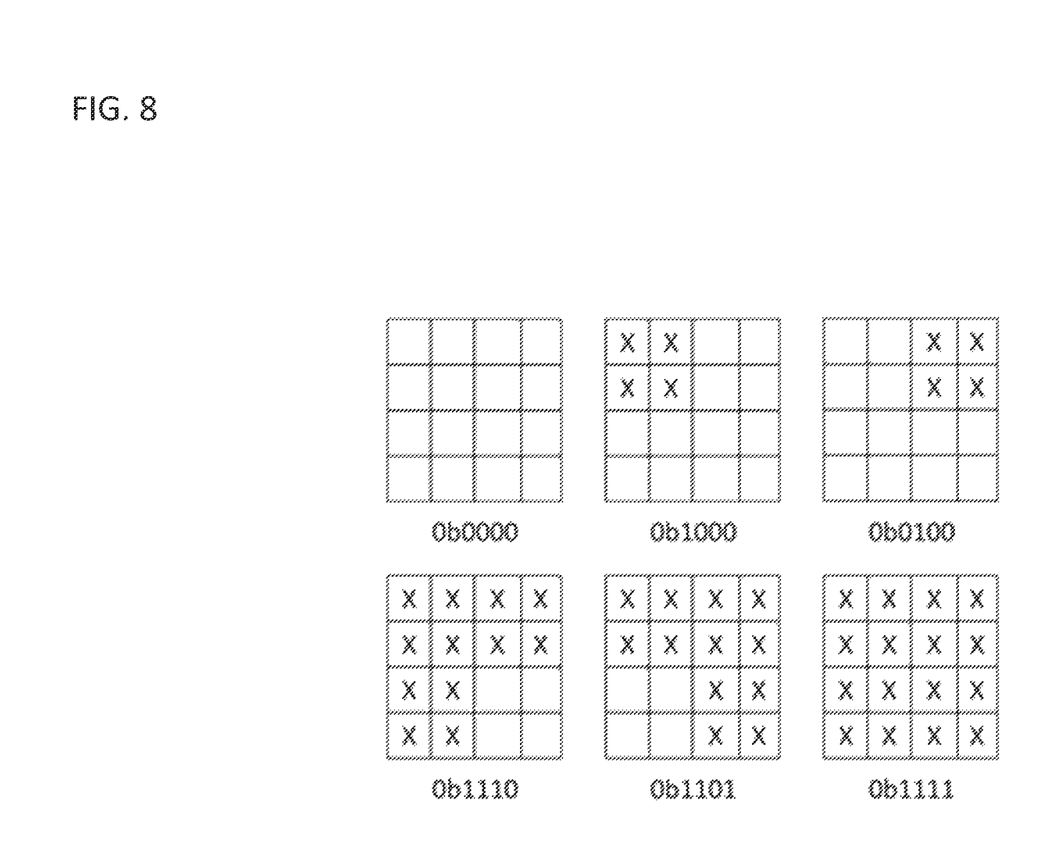
FIG. 8 illustrates examples of 4-bit occupancy representation of a 4×4 block, in accordance with an embodiment.

In another embodiment, B=4, and only 4 bits are allowed to represent the occupancy patterns of 4×4 blocks. Therefore, it is a representation of a subset of all occupancy patterns. For example, one can use each bit to represent every four pixels' occupancy status. For example, if a bit equals to 1, this may indicate that the four pixels are all occupied; otherwise, the four pixels are all empty. Examples are shown in FIG. 8. However, in embodiments, any mapping strategy can be used.

In embodiments, the non-binary occupancy map can be coded by lossy or lossless coding.

Figure 9:
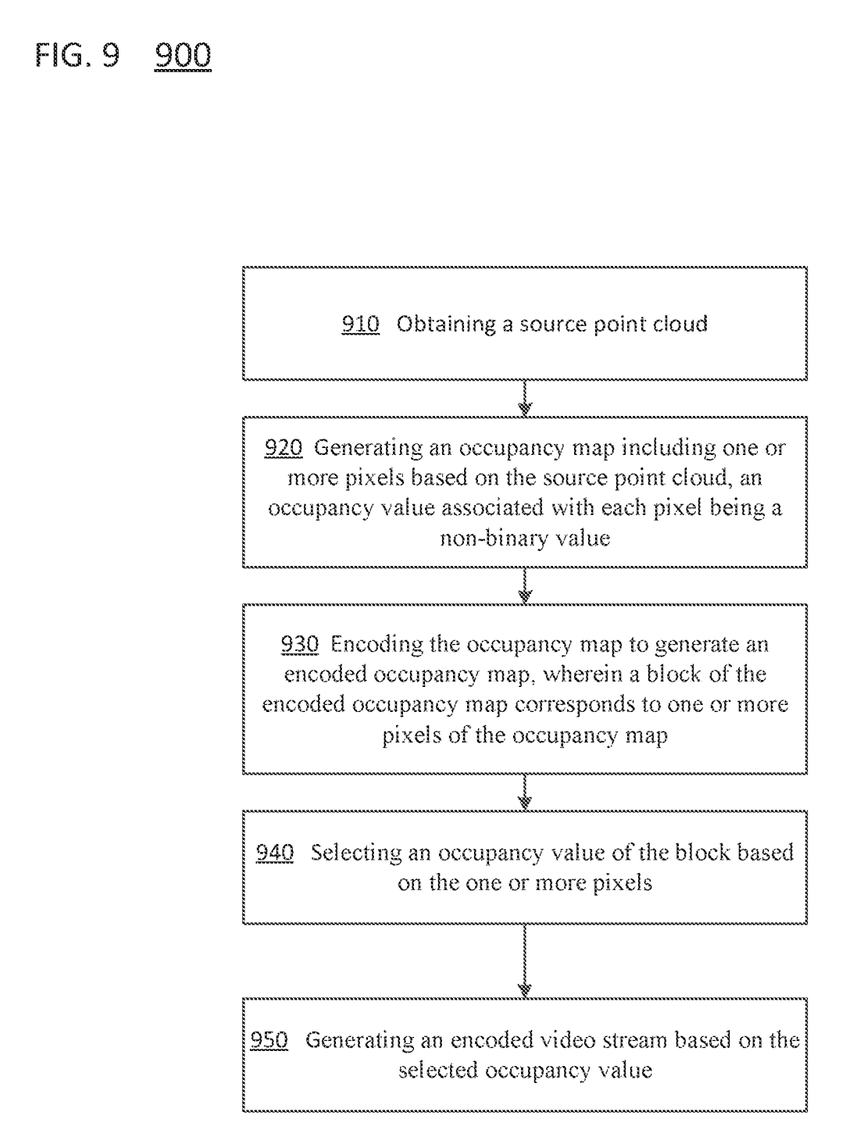
FIG. 9 is a flow diagram illustrating a process performed by an embodiment.

FIG. 9 is a flowchart of a method 900 of ???. In some implementations, one or more process blocks of FIG. 9 may be performed by encoder 203. In some implementations, one or more process blocks of FIG. 9 may be performed by another device or a group of devices separate from or including the encoder 203, such as the decoder 210.

As shown in FIG. 9, in operation 910, the method 900 may include obtaining a source point cloud.

In operation 920, the method 900 may include generating an occupancy map including one or more pixels based on the source point cloud. In embodiments, an occupancy value associated with each pixel may be a non-binary value.

In operation 930, the method 900 may include encoding the occupancy map to generate an encoded occupancy map, wherein a block of the encoded occupancy map corresponds to the one or more pixels of the occupancy map.

In operation 940, the method 900 may include selecting an occupancy value of the block based on the one or more pixels.

In operation 950, the method 900 include generating an encoded video stream based on the selected occupancy value.

In embodiments, a number of the one or more pixels may be 16, and the occupancy value may be a 16-bit value.

In embodiments, each bit of the 16-bit value may be used to signal an Occupancy of a corresponding pixel of the one or more pixels.

In embodiments, a most significant bit of the occupancy value may be used to signal an occupancy of a top-left pixel of the one or more pixels, a least significant bit of the occupancy value may be used to signal an occupancy of a bottom-right pixel of the one or more pixels, and remaining bits of the occupancy value may be used to signal remaining pixels of the one or more pixels in a raster scan order.

In embodiments, a number of the one or more pixels may be 16, and the occupancy value may be an 8-bit value.

In embodiments, each bit of the 8-bit value may be used to signal occupancies of two corresponding pixels of the one or more pixels.

In embodiments, a number of the one or more pixels may be 16, and the occupancy value may be a 4-bit value.

In embodiments, each bit of the 4-bit value ay be used to signal occupancies of four corresponding pixels of the one or more pixels.

In embodiments, the encoded occupancy map may be encoded using lossy or lossless coding.

Although FIG. 9 shows example blocks of the method 900, in some implementations, the method 900 may include additional blocks, fewer blocks, different blocks, or differently arranged blocks than those depicted in FIG. 9 Additionally, or alternatively, two or more of the blocks of the method 900 may be performed in parallel.

Figure 10:
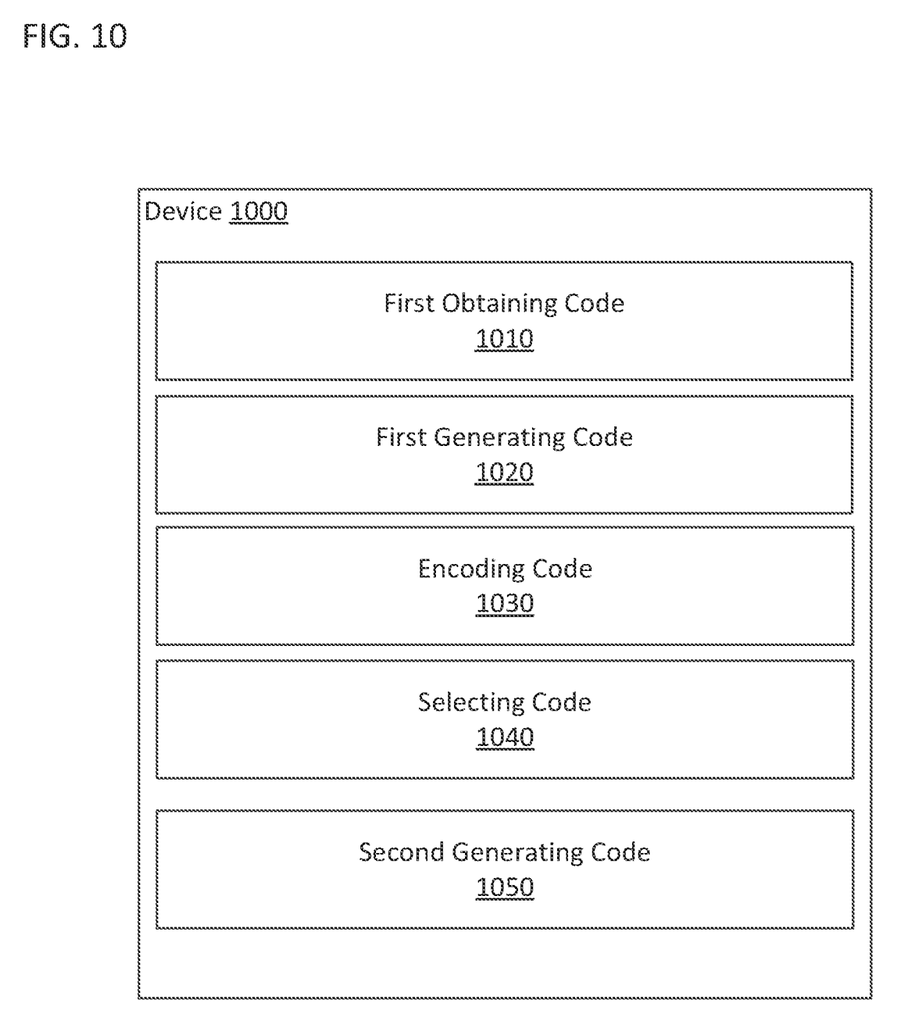
FIG. 10 is a diagram illustrating a device in accordance with an embodiment.

FIG. 10 is a diagram of an apparatus 1000 for encoding a video stream using video point cloud coding, according to embodiments. As shown in FIG. 10, the apparatus 800 includes first obtaining code 1010, first generating code 1020, encoding code 1030, selecting code 1040, and second generating code 1050.

The first obtaining code 1010 may be configured to cause the at least one processor to obtain a source point cloud.

The first generating code 1020 may be configured to cause the at least one processor to generate an occupancy map including one or more pixels based on the source point cloud. In embodiments, an occupancy value associated with each pixel may be a non-binary value.

The encoding code 1030 may be configured to cause the at least one processor to encode the occupancy map to generate an encoded occupancy map, wherein a block of the encoded occupancy map corresponds to the one or more pixels of the occupancy map.

The selecting code 1040 may be configured to cause the at least one processor to select an occupancy value of the block based on the one or more pixels.

The second generating code 1050 may be configured to cause the at least one processor to generate an encoded video stream based on the selected occupancy value.

The techniques, described above, can be implemented as computer software using computer-readable instructions and physically stored in one or more computer-readable media. For example, FIG. 11 shows a computer system 1100 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, interact of things devices, and the like.

Figure 11:
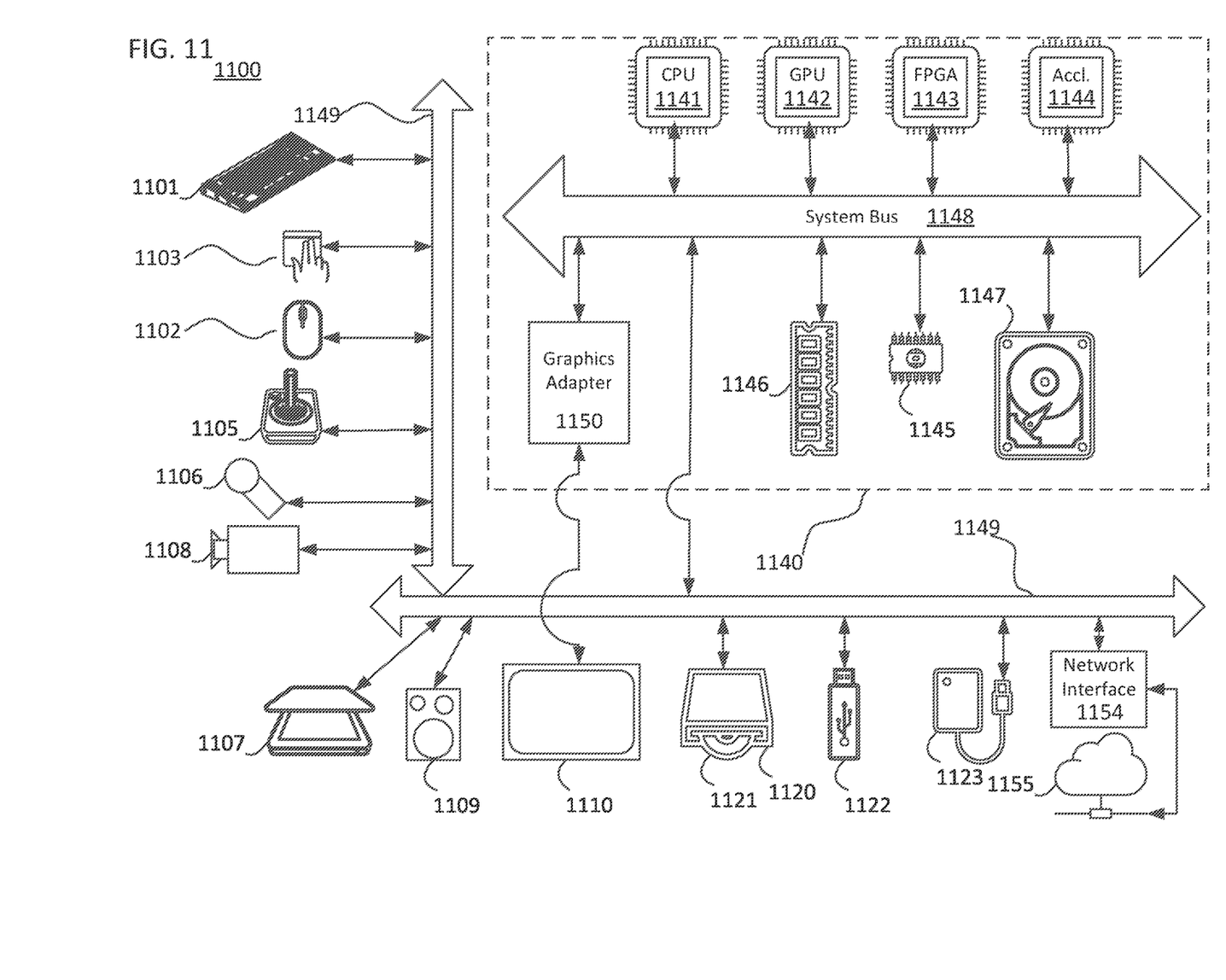
FIG. 11 is a diagram of a computer system suitable for implementing embodiments.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, hut there can also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100 others are commonly integrated into the core of the computer system 1100 by attachment to a system bus as described below (for example Ethernet interface into a PC computer system or cellular network interface into a smartphone computer system). Using any of these networks, computer system 1100 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1155. Certain protocols and protocol stacks can be used on each of those networks and network interfaces as described above.

Aforementioned human interface devices, human-accessible storage devices, and network interfaces 1154 can be attached to a core 1140 of the computer system 1100.

The core 1140 can include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also stored in RAM 1146, whereas permanent data can be stored for example, in the internal mass storage 1147. Fast storage and retrieve to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of encoding a video stream encoded using video point cloud coding, the method being performed by at least one processor and comprising:
    obtaining a source point cloud;
    generating an occupancy map based on the source point cloud;
    encoding the occupancy map to generate an encoded occupancy map, wherein a block of the encoded occupancy map corresponds to a plurality of pixels of the occupancy map;
    selecting an occupancy value of the block based on the plurality of pixels, wherein the occupancy value is a non-binary value, wherein each bit of the occupancy value indicates an occupancy pattern of a corresponding subset of two or more pixels of the plurality of pixels, wherein a number of the plurality of pixels is 16 and a number of bits of the non-binary value is 4, and wherein each bit of the non-binary value corresponds to an occupancy status of 4 pixels; and
    generating an encoded video stream based on the selected occupancy value.

2. The method of claim 1, wherein a most significant bit of the occupancy value is used to signal an occupancy of a top-left pixel of the plurality of pixels,
    wherein a least significant bit of the occupancy value is used to signal an occupancy of a bottom-right pixel of the plurality of pixels, and
    wherein remaining bits of the occupancy value are used to signal remaining pixels of the plurality of pixels in a raster scan order.

3. The method of claim 1, wherein the encoded occupancy map is encoded using lossy coding.

4. The method of claim 1, wherein the encoded occupancy map is encoded using lossless coding.

5. An apparatus for encoding a video stream using video point cloud coding, the apparatus comprising:
    at least one memory configured to store program code; and
    at least one processor configured to read the program code and operate as instructed by the program code, the program code comprising:
    first obtaining code configured to cause the at least one processor to obtain a source point cloud;
    first generating code configured to cause the at least one processor to generate an occupancy map based on the source point cloud;
    encoding code configured to cause the at least one processor to encode the occupancy map to generate an encoded occupancy map, wherein a block of the encoded occupancy map corresponds to a plurality of pixels of the occupancy map;
    selecting code configured to cause the at least one processor to select an occupancy value of the block based on the plurality of pixels, wherein the occupancy value is a non-binary value, wherein each bit of the occupancy value indicates an occupancy pattern of a corresponding subset of two or more pixels of the plurality of pixels, wherein a number of the plurality of pixels is 16 and a number of bits of the non-binary value is 4, and wherein each bit of the non-binary value corresponds to an occupancy status of 4 pixels; and
    second generating code configured to cause the at least one processor to generate an encoded video stream based on the selected occupancy value.

6. The apparatus of claim 5, wherein the encoded occupancy map is encoded using lossy coding.

7. The apparatus of claim 5, wherein the encoded occupancy map is encoded using lossless coding.

8. A non-transitory computer-readable medium storing computer instructions encoding a video stream using video point cloud coding that, when executed by at least one processor, cause the at least one processor to:
    obtain a source point cloud;
    generate an occupancy map based on the source point cloud;
    encode the occupancy map to generate an encoded occupancy map, wherein a block of the encoded occupancy map corresponds to a plurality of pixels of the occupancy map;
    select an occupancy value of the block based on the plurality of pixels, wherein the occupancy value is a non-binary value, wherein each bit of the occupancy value indicates an occupancy pattern of a corresponding subset of two or more pixels of the plurality of pixels, wherein a number of the plurality of pixels is 16 and a number of bits of the non-binary value is 4, and wherein each bit of the non-binary value corresponds to an occupancy status of 4 pixels; and generate an encoded video stream based on the selected occupancy value.

* * * * *